United States Patent
Fujii

(10) Patent No.: US 6,804,537 B1
(45) Date of Patent: Oct. 12, 2004

(54) DATA COMMUNICATION SYSTEM PROVIDING MOST ADAPTIVE INITIAL MENU AND DATA COMMUNICATION TERMINAL USED IN THE SAME

(75) Inventor: Masahiro Fujii, Tokyo (JP)

(73) Assignee: NEC Corporation, Tokyo (JP)

( * ) Notice: Subject to any disclaimer, the term of this patent is extended or adjusted under 35 U.S.C. 154(b) by 535 days.

(21) Appl. No.: 09/704,615

(22) Filed: Nov. 3, 2000

(30) Foreign Application Priority Data

Nov. 8, 1999 (JP) .......................................... 11-316828

(51) Int. Cl.$^7$ ........................... H04M 1/00; H04M 3/42; H04M 11/00; H04B 1/38
(52) U.S. Cl. ...................... 455/557; 455/425; 455/407; 455/414.1; 455/466; 455/517
(58) Field of Search ............................... 455/405, 407, 455/412.1, 422.1, 466, 507, 517, 557, 566, 406, 456.3, 414.1

(56) References Cited

U.S. PATENT DOCUMENTS

| | | | | |
|---|---|---|---|---|
| 6,169,897 B1 | * | 1/2001 | Kariya | 455/456.3 |
| 6,272,332 B1 | * | 8/2001 | Matsumoto et al. | 455/412.1 |
| 6,430,409 B1 | * | 8/2002 | Rossmann | 455/422.1 |
| 6,473,609 B1 | * | 10/2002 | Schwartz et al. | 455/406 |

FOREIGN PATENT DOCUMENTS

| | | |
|---|---|---|
| JP | H06-309135 A | 11/1994 |
| JP | H08-63433 A | 3/1996 |
| JP | 10-161832 | 6/1998 |
| JP | 10-207710 | 8/1998 |
| JP | 11-120487 | 4/1999 |
| JP | 11-127427 | 5/1999 |
| JP | 11-136365 | 5/1999 |
| JP | H11-298822 A | 10/1999 |

\* cited by examiner

Primary Examiner—Simon Nguyen
(74) Attorney, Agent, or Firm—Sughrue Mion, PLLC

(57) ABSTRACT

A data communication system includes a plurality of server sections, each of which stores content data, and a mobile station connectable to the plurality of server sections, and having a table which stores a set of address data and identification data for each of the plurality of server sections. The mobile station displays the identification data of the table for the plurality of server sections, and automatically transmits a data transmission request to a specific one of the plurality of server sections based on the address data corresponding to the specific server section, when the identification data for the specific server section is selected. The specific server section transmits the content data stored therein to the mobile station. The mobile station displays the content data transmitted from the specific server section.

21 Claims, 10 Drawing Sheets

| TRANSMISSION SOURCE ADDRESS DATA (61) | MENU DISPLAY DATA (62) | ACCESS COUNT A BEFORE 20 TO 29 DAYS (63) | ACCESS COUNT A BEFORE 10 TO 19 DAYS (64) | ACCESS COUNT A BEFORE 0 TO 9 DAYS (65) |
|---|---|---|---|---|
| www.nec.co.jp | NEC | 10 | 30 | 10 |
| www.jpo-miti.go.jp | PATENT OFFICE | 5 | 5 | 20 |
| www.kantei.go.jp | PRIME MINISTER OFFICIAL RESIDENCE | 2 | 10 | 10 |
| www.uspto.gov | USPTO | 5 | 5 | 0 |
| ⋮ | ⋮ | ⋮ | ⋮ | ⋮ |

Fig. 6

| TRANSMISSION SOURCE ADDRESS DATA | MENU DISPLAY DATA | ACCESS COUNT A BEFORE 20 TO 29 DAYS | ACCESS COUNT A BEFORE 10 TO 19 DAYS | ACCESS COUNT A BEFORE 0 TO 9 DAYS |
|---|---|---|---|---|
| www.nec.co.jp | NEC | 10 | 30 | 10 |
| www.jpo-miti.go.jp | PATENT OFFICE | 5 | 5 | 20 |
| www.kantei.go.jp | PRIME MINISTER OFFICIAL RESIDENCE | 2 | 10 | 10 |
| www.uspto.gov | USPTO | 5 | 5 | 0 |
| ...... | ...... | ...... | ...... | ...... |

Fig. 7

1. NEC
2. PATENT OFFICE
3. PRIME MINISTER OFFICIAL RESIDENCE
4. USPTO

DATA COMMUNICATION SYSTEM PROVIDING MOST ADAPTIVE INITIAL MENU AND DATA COMMUNICATION TERMINAL USED IN THE SAME

BACKGROUND OF THE INVENTION

1. Field of the Invention

The present invention relates to a data communication apparatus and data communication system for receiving non-speech data. More particularly, the present invention relates to a data communication apparatus and data communication system for receiving data selected in accordance with a menu.

2. Description of the Related Art

The technique for the integration and mounting of a semiconductor device, and the communication technique have rapidly advanced in recent years. Thus, it is now possible to transmit and receive electronic mails, and to browse content data of various data formats, such as characters, figures, and images, using mobile stations as mobile data communication apparatuses. A portable phone and a personal digital assistant (hereinafter abbreviated as PDA) are typical examples of the mobile stations as the data communication apparatuses. Particularly, the mobile phone is improved in size and weight and superior in portability. In addition, the mobile hone can be connected to a base station via a radio channel for speech communication. Also, the mobile phone can acquire content data as the above-mentioned non-speech data from various servers on the Internet to which computer networks are connected and to display the content data on a display unit of the mobile phone.

Such a mobile phone can be connected to a mobile communication network via the base station. The mobile communication network is connected to a gateway server and a content server via a switching apparatus accommodating a public telephone network connected to subscriber telephones. The content server is accommodated on the Internet, and stores non-speech data such as characters, figures, and images as content data. The gateway server carries out protocol conversion between a network composed of the mobile communication network and the public telephone network and the Internet in which the content server is accommodated.

FIG. 1 shows a flow of a series of processes for browsing content data by the conventional mobile phone as a mobile station in the data communication system described above. In this case, it is supposed that a radio channel has already been established between the mobile station and a base station. First, when the content data should be browsed, the mobile station transmits a connection request 10 to a content server via the base station, a switching apparatus and a gateway server. When the content server receives the connection request 10, and approves the connection, the content server sends back a connection confirmation 11 via the gateway server, the switching apparatus and the base station. In this way, a session between the content server and the mobile station as the data communication apparatus on the receiver side is established.

Next, an initial menu display data 12 is transmitted from the content server to the mobile station. The initial menu display data 12 is described in a predetermined data description language such as Compact Hypertext Markup Language (hereinafter abbreviated as C-HTML) and Wireless Markup Language (hereinafter abbreviated as WML) used in the Wireless Application Protocol (hereinafter abbreviated as WAP) system. The initial menu display data 12 is described in a text file format, and character modifications and layout designation are carried out in accordance with tags composed of reserved word codes put between the marks "<" and ">". The various types of designations are carried out between the tag put between the symbols "<" and ">" and the tag in which the same reserved word codes as those of the above tag are put between the symbols "</" and ">". In the data description language, specific data to be displayed can be linked to other content data. Accordingly, it is possible to acquire a large amount of linked data according to necessity, even when the displayed content data itself has only a description for display.

The initial menu display data 12 received by the mobile station is described in the above-mentioned data description language. A list of content data acquirable from the content server is displayed as an initial menu screen (initial menu display 13) by use of a browser function installed in the mobile station.

FIG. 2 shows an example of the initial menu screen display on a display section of the mobile station. On the display section 14 of the mobile station are shown "MY MENU", "INFORMATION IN THIS WEEK", "WEATHER REPORT", and "NEWS" in units of items as the list of content data acquirable from the content server. Each of the items on the initial menu display data is linked to the content data stored in the content server.

As mentioned above, in the mobile station, the menu display data is displayed on the display section thereof by the browser function, to promote the user of the mobile station to carry out a selecting operation. When the user selects one of the items, a data transmission request 15 of the content data linked to the selected item is sent to the content server. In response to the data transmission request 15, the content server transmits content data 16 requested by the user to the mobile station. The mobile station receives the content data 16 and transmits an acknowledge (ACK) 17 to the content server.

As such, in the conventional data communication apparatus and data communication system, each time the data communication apparatus is connected to the content server, the initial menu display data is transmitted and the initial menu display data is displayed based on the initial menu display data. Then, the data communication apparatus issues a data transmission request for requesting the content data linked to one selected from among the displayed items. Therefore, the user needs to follow a hierarchy of menu screens in order to access desired data. As a result, the user is required to carry out a troublesome operation before acquiring the desired content data. In addition, it takes much time for the user to acquire the desirable content data.

In order to solve the problems, a mobile terminal apparatus is disclosed in Japanese Laid Open Patent Application (JP-A-Heisei 11-120487). In this reference, menu display data is possessed in advance by the data communication apparatus and is updated into new menu display data to be received in response to a searching request to a predetermined data center. Thus, the data communication apparatus needs not to receive the menu display data each time the data communication apparatus is connected to a content server. Also, the data communication apparatus can always display an initial menu display data having the latest menu items to allow desirable content data to be acquired.

In addition, there is known Japanese Laid Open Patent Application (JP-A-Heisei 10-207710) entitled "software download system and menu generation system". In this reference, software installation data is transmitted from a data communication terminal to a host apparatus such as a content server. A download menu display data of software corresponding to the software installation data is sent back. Thus, a menu display data most suitable for the condition of each data communication terminal can be displayed. Therefore, it is possible to eliminate a troublesome operation without following the hierarchy of some menu display data.

As described above, in the data communication apparatus and the data communication system disclosed in Japanese Laid Open Patent Application (JP-A-Heisei 11-120487), the latest version of the list of content data stored in the content server can be displayed on the display section. However, the user of the data communication apparatus still needs to follow the hierarchy of menu screens to acquire the desirable content data. This is because the menu display data is only updated in accordance with the condition between the content server and the data communication apparatus. Therefore, it is impossible to display a menu display data for easily browsing desired content data.

In addition, in the data communication apparatus and the data communication system disclosed in Japanese Laid Open Patent Application (JP-A-Heisei 10-207710), a menu screen can be displayed in accordance with the condition of each data communication terminal. However, the user of the data communication apparatus still needs to follow the hierarchy of menu screens to acquire desired content data. This is because the menu display data is only updated in accordance with the condition of the data communication terminal.

In other words, in the data communication apparatus and data communication system proposed in the above conventional examples, the menu screen is only displayed in accordance with the conditions of the server and the data communication apparatus. There is no consideration for an actual access condition and interest of a user who uses the data communication apparatus. Thus, it is almost impossible for the user to easily acquire desirable content data in accordance with the menu screens prepared by the server.

In conjunction with the above description, an electric device with a menu which can be customized by a user is disclosed in Japanese Laid Open Patent Application (JP-A-Heisei 10-161832). In this reference, the electric device has a memory which stores the menu composed of elements adaptive the user, and a display unit which displays the menu on its screen, and a customizing unit which customizes the display of the menu. The electric device further includes a locking and releasing unit which locks a parameter of the menu and releases the lock, and a display and mask unit which cooperates with the locking and releasing unit which selectively displays or masks the menu element which is released or locked. The electric device is applicable to a portable phone and an apparatus with a menu screen.

Also, a portable terminal VOD system is disclosed in Japanese Laid Open Patent Application (JP-A-Heisei 11-127427). In this reference, a menu is requested to a WEB server 5 through a radio converter 4. Next, when material is requested from a portable terminal 6 through a VOD management unit 3, a request command is sent to the VOD management unit 3 in not HTTP protocol but SOCKET protocol. A photoelectric converting unit 2 takes out a requested material from a material server 1 to transmit to the portable terminal 6 through a light transmission path. Thus, a proxy function of the VOD management unit 3 becomes unnecessary to attaine the reliable transmission of the request command and the reduction of network load.

Also, an information distributing system is disclosed in Japanese Laid Open Patent Application (JP-A-Heisei 11-136365). In this reference, a portable terminal 103 containing a cellular phone and PHS has a large capacity of memory 122. A content is selected based on information registered previously by a user and is distributed to the user from a communication provider system 102 at a timing selected by the user. The content is stored automatically in the memory 122 by way of a predetermining rule. The user can repetitively see and hear the stored content. In this way, the desired latest content can be distributed, and stored or updated.

SUMMARY OF THE INVENTION

Therefore, an object of the present invention is to provide a data communication apparatus and a data communication system, in which a menu display data most adaptive for an access condition and interest of a user can be displayed, and desirable data can be easily acquired.

In order to achieve an aspect of the present invention, a data communication system includes a plurality of server sections, each of which stores content data, and a mobile station connectable to the plurality of server sections, and having a table which stores a set of address data and identification data for each of the plurality of server sections. The mobile station displays the identification data of the table for the plurality of server sections, and automatically transmits a data transmission request to a specific one of the plurality of server sections based on the address data corresponding to the specific server section, when the identification data for the specific server section is selected. The specific server section transmits the content data stored therein to the mobile station. The mobile station displays the content data transmitted from the specific server section.

Here, the table may further include count data for at least one time period in addition to the address data and the identification data as the set for each of the plurality of server sections. Also, the content data comprises data elements. In this case, the mobile station counts up the count data when the mobile station receives a head one of the data elements of the content data from the specific server section.

Also, when the mobile station receives a head one of data elements of content data from another server section, the mobile station desirably registers the identification data and the address data of the other server section on the table and counts up the count data for the other server station. In this case, the table may include the count data for each of a plurality of time periods. In this case, it is desirable that the mobile station sequentially shifts the count data for one time period as the count data for the time period before the one time period, when the latest time period has elapsed.

Also, in order to achieve another aspect of the present invention, a data communication system includes a first server section which stores content data, a second server section which stores a plurality of initial menu display data, and a mobile station connectable to the first and second server section and a memory storing download screen data. The mobile station reads out the download screen data from the memory to display a download screen composed of items, and transmits item selection data indicative of one of the items to the second server section when the one item of the items is selected. The second server transmits one of the plurality of initial menu display data corresponding to the item selection data to the mobile station, the initial menu display data includes a set of address data and identification data of the first server section. The mobile station displays the initial menu display data, automatically transmits a data transmission request to the first server section based on the address data of the first server section, when the identification data for the first server section is selected. The first server section transmits the content data stored therein to the mobile station, and the mobile station displays the content data transmitted from the first server section.

Here, the first server section and the second server section may be identical to each other.

Also, the mobile station may store the initial menu display data transmitted from the second server section in a table of the memory. The table may further include count data for at least one time period in addition to the address data and the identification data as the set for the first server section. Moreover, the content data may be composed of data elements. In this case, the mobile station desirably counts up the count data when the mobile station receives a head one of the data elements of the content data from the first server section. At that time, when the mobile station receives a head one of data elements of content data from another server section, the mobile station desirably registers the identification data and the address data of the other server section on the table and counts up the count data for the other server station. Also, the table may include the count data for each of a plurality of time periods. In this case, the mobile station sequentially shits the count data for one time period as the count data for the time period before the one time period, when the latest time period has been elapsed.

In order to achieve another aspect of the present invention, a data communication system includes a first server section which stores content data, a second server section which stores a plurality of initial menu display data, and a mobile station connectable to the first and second server section and having a table which stores a set of address data, identification data and count data for at least one time period for at least one server section. The mobile station reads out the table to transmit to the second server section. The second server determines one of the plurality of initial menu display data based on content of the table to transmit to the mobile station, the initial menu display data includes a set of address data and identification data of the first server section. The mobile station displays the initial menu display data, automatically transmits a data transmission request to the first server section based on the address data of the first server section, when the identification data for the first server section is selected. The first server section transmits the content data stored therein to the mobile station, and the mobile station displays the content data transmitted from the first server section.

Here, the first server section and the second server section may be identical to each other.

Also, the mobile station stores the initial menu display data transmitted from the second server section in the table. The content data may be composed of data elements. In this case, the mobile station desirably counts up the count data when the mobile station receives a head one of the data elements of the content data from the first server section. In this case, when the mobile station receives a head one of data elements of content data from another server section, the mobile station desirably registers the identification data and the address data of the other server section on the table and counts up the count data for the other server station. Also, the mobile station sequentially desirably shits the count data for one time period as the count data for the time period before the one time period, when the latest time period has been elapsed.

In order to achieve another aspect of the present invention, a data communication terminal includes a display section, a communication section, a memory which stores a table storing a set of address data, identification data and count data for at least one time period for each of a plurality of server sections, and a control section. The control section controls the display section to display the identification data of the table for the plurality of server sections. Also, the control section controls the communication section to automatically transmit a data transmission request to a first one of the plurality of server sections based on the address data corresponding to the first server section, when the identification data for the first server section is selected on the display section. Further, the control section controls the display section to display the content data transmitted from the first server section.

Here, the content data may be composed of data elements. In this case, the control section counts up the count data when a head one of the data elements of the content data is received from the first server section by the communication section. Also, when the head one of data elements of content data is received from another server section by the communication section, the control section may register the identification data and the address data of the another server section on the table and counts up the count data for the another server station.

Also, the table may include the count data for each of a plurality of time periods. In this case, it is desirable that the control section sequentially shits the count data for one time period as the count data for the time period before the one time period, when the latest time period has been elapsed.

Also, the memory may store download screen data. In this case, the control section reads out the download screen data from the memory, and controls the display section to display a download screen composed of items based on the read out download screen data. Also, the control section controls the communication section to transmit item selection data indicative of one of the items to a second one of the plurality of server sections when one item of the items is selected on the display section. Further, the control section controls the communication section to receive initial menu display data corresponding to the item selection data, and control the display section to display the received initial menu display data. In this case, the first server section and the second server section may be identical to each other.

Also, the control section may store the received initial menu display data in the table.

Also, the control section may read out the table, and control the communication section to transmit the read out table to a second one of the plurality of server sections. The control section further controls the display section to display initial menu display data transmitted from the second server section based on the table. In this case, the first server section and the second server section may be identical to each other. Also, the control section may store the initial menu display data transmitted from the second server section in the table.

BRIEF DESCRIPTION OF THE DRAWINGS

FIG. 6 is a diagram showing the structure of an access frequency table incorporated in the mobile station in the first embodiment;

FIG. 7 is a diagram showing an example of the initial menu display data displayed on a display section of the mobile station in the first embodiment;

DESCRIPTION OF THE PREFERRED EMBODIMENTS

Hereinafter, a data communication system of the present invention will be described below in detail with reference to the attached drawings.

First Embodiment

Figure 1:
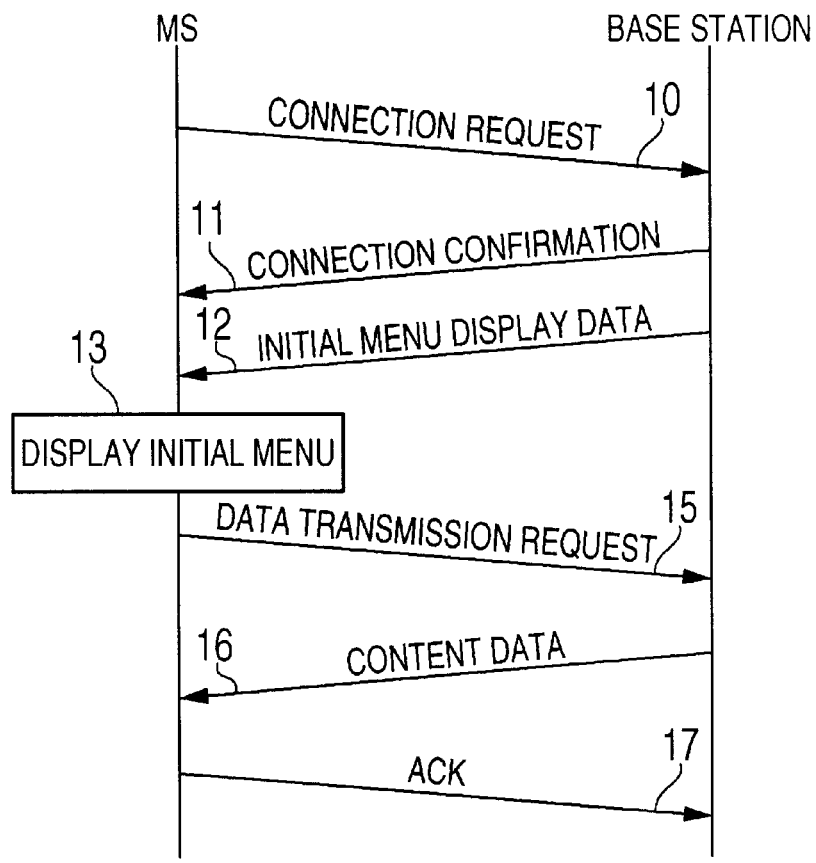
FIG. 1 shows a flow of a series of processes for browsing content data in a conventional mobile phone as a mobile station in a conventional data communication system.
Figure 2:
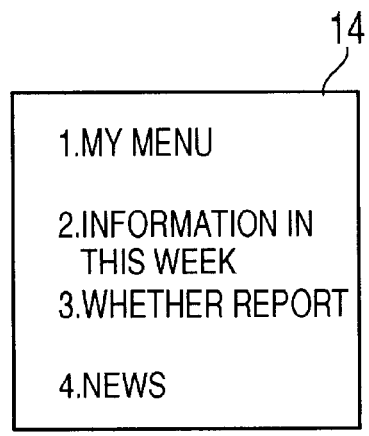
FIG. 2 shows an example of an initial menu screen on a display section of the conventional mobile station.
Figure 3:
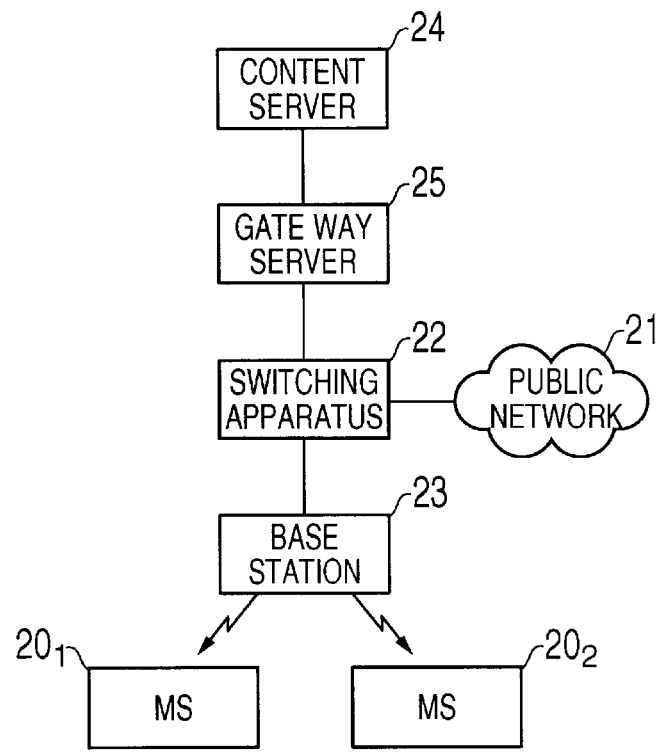
FIG. 3 shows an outline of the structure of a data communication system according to a first embodiment of the present invention.

FIG. 3 shows an outline of the structure of a data communication system according to the first embodiment of the present invention. In this embodiment, a description will be given of a case in which a mobile station as a data communication apparatus acquires various types of content data from a content server provided on the Internet to which computer networks are connected, to display the data on a display section. In the following description, the mobile station is assumed to be a mobile phone.

The data communication system according to the first embodiment is composed of mobile station $20_1$ and $20_2$, a switching apparatus 22 and a base station 23. The mobile station $20_1$ and $20_2$ can carry out data communication by use of radio channels. The switching apparatus 22 is accommodated in a public network 21 as a public telephone line network. The base station 23 is connected to the switching apparatus 22 which is connected to the mobile station $20_1$ and $20_2$ via the radio channels. In addition, the data communication system according to the first embodiment is further composed of a content server 24 and a gateway server 25. The content server 24 is disposed on the Internet and stores various types of content data as non-speech data such as characters, figures and images. The gateway server 25 is connected to the content server 24 and the switching apparatus 22 via data communication channels. The gateway server 25 carries out mutual conversion between a communication procedure corresponding to transmission channels to the mobile station $20_1$ and $20_2$ via a base station 23 and a communication procedure corresponding to data communication channels to the content server 24. Only the mobile station $20_1$ will be described under the assumption that the structure and operations of the mobile station $20_1$ and $20_2$ are the same.

In the data communication system having the above structure, the mobile stations $20_1$ and $20_2$ are connected to the base station 23 via the radio channels and carry out a speech communication with each other. In addition, the mobile station $20_1$ or $20_2$ can carry out speech communication with a subscriber telephone accommodated in the public network 21 via the switching apparatus 22. Moreover, the mobile station $20_1$ or $20_2$ can carry out data communication via the switching apparatus 22 in which a mail server function is incorporated, or a mail server (not shown), in addition to the speech communication. In addition, the mobile station $20_1$ or $20_2$ can receive content data stored in the content server 24 via the gateway server 25, the switching apparatus 22, the base station 23, and the radio transmission channel to display the content data on a display section. The data communication from the content server 24 to the mobile station $20_1$ and $20_2$ is carried out by a pull technique which is carried out in accordance with a request from the mobile station $20_1$ and $20_2$ or a push technique which is carried out with no request from mobile station $20_1$ and $20_2$. In this case, the gateway server 25 carries out the mutual conversion between the communication procedure corresponding to the transmission channel from the gateway server 25 to the mobile station $20_1$ or $20_2$ via the switching apparatus 22 and the base station 23, and the communication procedure corresponding to the data communication channel from the gateway server 25 to the content server 24 to relay various types of data.

The content data stored in the content server 24 is described in a predetermined data description language such as HTML, C-HTML, and WML. The content data is described in a text file format, and modification of characters and designation of a layout are carried out in accordance with a tag composed of reserved word codes put between the symbols "<" and ">". The various designations are described between a tag put between the symbols "<" and ">" and a tag composed of the same reserved codes as those of the former tag, and put between the symbols "</" and ">". In the data description language, specified display data can be linked to other content data. Accordingly, if displayed content data has only a description language for display, it is possible to acquire a large amount of the linked content data only when needed.

Figure 4:
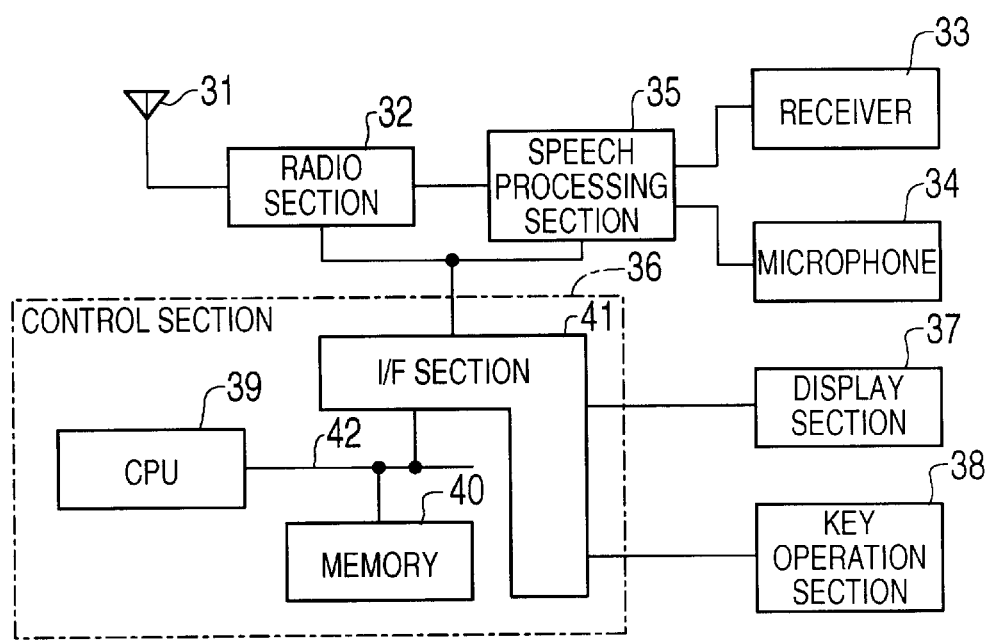
FIG. 4 is a block diagram showing the structure of a mobile station according to the first embodiment of the present invention.

FIG. 4 shows the outline of the functional block structure of the mobile station $20_1$ shown in FIG. 3. The mobile station $20_1$ is composed of an antenna 31, a radio section 32, a speech processing section 35, a receiver 33, a microphone 34, a display section 37 and a key operation section 38. The antenna 31 is used for transmitting and receiving a radio signal between the mobile station $20_1$ and the base station 23 via a radio channel. The radio section 32 carries out frequency selection and frequency conversion of the radio signal transmitted and received by the antenna 31. The speech processing section 35 demodulates a speech signal received by the radio section 32 to output as an acoustic signal from the receiver 33. Also, the speech processing section 35 modulates a speech signal as an electric signal obtained through conversion of an acoustic signal inputted from the microphone 34 to transmit from the radio section 32. In addition, the mobile station $20_1$ is further composed of a control section 36. The control section 36 controls communication carried out by use of the speech signal. The control section 36 controls the display section 37 as a liquid crystal display device to display visual data such as characters, figures, and images in accordance with the received non-speech signal, when the signal received by the radio section 32 is a non-speech signal. The key operation section 38 is used to carry out switching between display of the received data and the speech communication, in accordance with operation data. The operation data is inputted from the key operation section 38 and detected by the control section 36.

The control section 36 has a central processing unit (hereinafter abbreviated as CPU) 39, a memory 40 as a nonvolatile storing device, and an interface (hereinafter abbreviated as IF) 41 including a display driver. The CPU 39, the memory 40 and the interface 41 are connected to each other via a bus 42. The CPU 39 controls the radio section 32, the sound processing section 35, and the display section 37 via the interface section 41, and monitors the input of the operation data from the key operation section 38. In addition, with the CPU 39, the control section 36 can carry out a variety of control based on a control program stored in the memory 40.

In case that the content data stored in the content server 24 is acquired by the mobile station $20_1$, the mobile station $20_1$ reads out an initial menu display data stored in advance in the memory 40 in accordance with an access condition and interest of a user, after a session is established between the mobile station $20_1$ and the content server 24. The read out display data is displayed on the display section 37. Then, content data selected by the user is received from the content server 24. Thus, the user can browse the received content data so that it is displayed on the display section 37.

Figure 5:
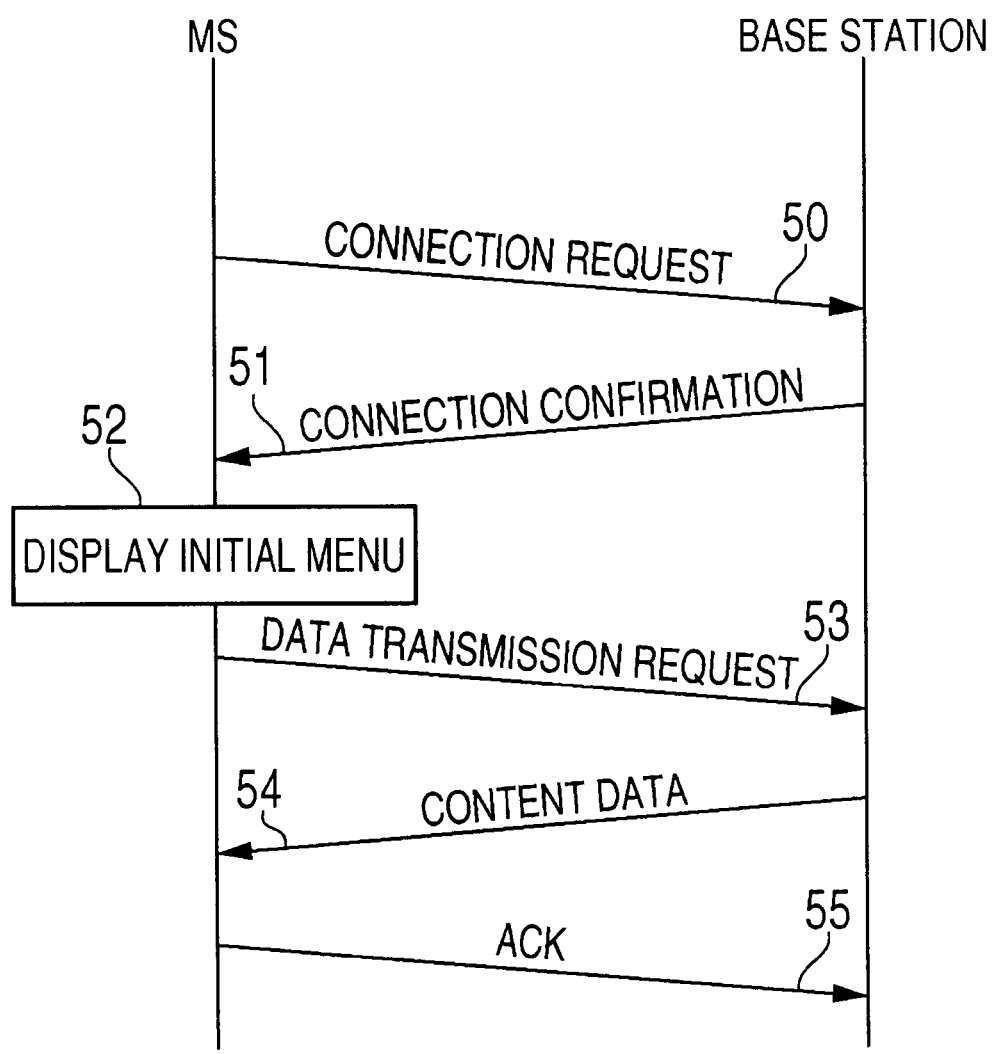
FIG. 5 a sequence diagram showing a process of acquiring content data in the data communication system according to the first embodiment.

FIG. 5 shows a process of acquiring a series of content data in the data communication system according to the first embodiment. In order to acquire content data, the mobile station $20_1$ as a data communication apparatus first transmits a connection request 50 to the content server 24 via the base station 23, the switching apparatus 22, and the gateway server 25. When the content server 24 receives the request 25 and then approves the connection, the content server 24 sends back a connection confirmation 51 to the mobile station $20_1$ via the gateway server 25, the switching apparatus 22, and the base station 23. The procedure allows a session to be established between the content server 24 and the mobile station $20_1$ as the data communication apparatus on the receiver side.

When the session is established, the mobile station $20_1$ reads out the initial menu display data stored in the memory 40 to display the read out initial menu display data on the display section 37 (DISPLAY OF INITIAL MENU 52). The mobile station $20_1$ generates the initial menu display data based on access counts within fixed periods of time in the past. To this end, the mobile station $20_1$ has an access frequency table 60.

FIG. 6 shows an outline of the structure of the access frequency table 60 incorporated in the mobile station $20_1$ used in the first embodiment. The access frequency table 60 used in the first embodiment stores transmission source address data 61, menu display data as item data 62, access count data A 63, access count data B 64 and access count data C 65. The transmission source address data 61 as a Uniform Resource Locator (URL) is data for identifying the content server 24 storing the content data to be accessed. The menu display data as item data 62 is data to be displayed on the menu display data in accordance with the transmission source address data 61. The access count data A 63 indicates an access count to content data of the content server 24 designated by the transmission source address data 61 before 20 to 29 days from the current time or day. The access count data B 64 indicates an access count to content data of the content server 24 designated by the transmission source address data 61 before 10 to 19 days from the current time. The access count data C 65 indicates an access count to content data of the content server 24 designated by the transmission source address data 61 before 0 to 9 days from the current time. For example, an address identified by the URL of "www.nec.co.jp" as the transmission source address data 61 is displayed on the initial menu display data in accordance to the item of "NEC". That is, the item of "NEC" is linked with the content data stored in the content server 24 designated by the URL of "www.nec.co.jp". When the item is selected, the content data corresponding to the URL of "www.nec.co.ip" can be acquired. Usually, the menu display data for browsing a variety of content data stored in the content server 24 is stored in the higher layer of the menu hierarchy and is received as the content data. Also, FIG. 6 shows that the access count to the content server 24 designated by the URL of "www.nec.cojp" is 10 times before 20 to 29 days, 30 times before 10 to 19 days, and 10 times before 0 to 9 days. The control section 36 of the mobile station $20_1$ generates an initial menu display data based on the access frequency table 60 to register in the memory 40.

FIG. 7 shows an example of the initial menu displayed on the display section 37 of the mobile station $20_1$ based on the initial menu display data. In this case, the initial menu is displayed on the display section 37 based on the access frequency table shown in FIG. 6, and the initial menu includes all the item data 62. In other words, the item data 62 registered in the access frequency table 60 are displayed as selectable item data, and each item data is linked to the URL registered as the transmission source address data 61. In this example, the example is shown in which all of the item data of the access frequency table shown in FIG. 6 are displayed as the selectable item data. Besides this, there are various methods for displaying the initial menu display data. For example, only item data having access counts A, B, and C greater than predetermined thresholds may be set as selectable item data. Also, the item data may be arranged in order of levels obtained by weighting the access counts A, B, and C in accordance with a predetermined calculation equation so that the access count of a period close to the current time is emphasized as strong as possible. Otherwise, only the access counts C may be arranged in order from the maximum in the access count C field which is the closest to the current time.

Referring to FIG. 5 again, when the display section 37 displays the initial menu display data in the mobile station $20_1$, the user of the mobile station $20_1$ is prompted to select one of the item data. The user selects one from among the displayed selectable item data to request the acquisition of content data stored in a content server 24 designated by a URL linked to the selected item data. The request is transmitted as the data transmission request 53 to the content server 24 via the base station 23, the switching apparatus 22, and the gateway server 25. In response to the data transmission request 53, the content server 24 transmits the requested content data 54 to the mobile station $20_1$. The mobile station $20_1$ receives the content data 54, and then sends back an acknowledge ACK 55 to the content server 24.

As shown in FIG. 6 described above, the mobile station $20_1$ used in the first embodiment stores the access counts of three periods, in which every period is equivalent to the length of 10 days. The control section 36 of the mobile station $20_1$ has a counter (not shown) to count the number of days. The reason why the period of 10 days is set as one period and only the three periods are set is that the memory 40 overflows so that the access count is lost, if all of the access counts from the start of the use of the mobile station $20_1$ are accumulated. In addition, in the mobile station $20_1$ of the first embodiment, it is possible to grasp the access tendency in the past during the three long periods of 30 days, even when the access tendency to the content server 24 changes only during a certain period of time. Therefore, the change or update of the initial menu display data caused due to temporary change in the access tendency can be prevented.

Figure 8:
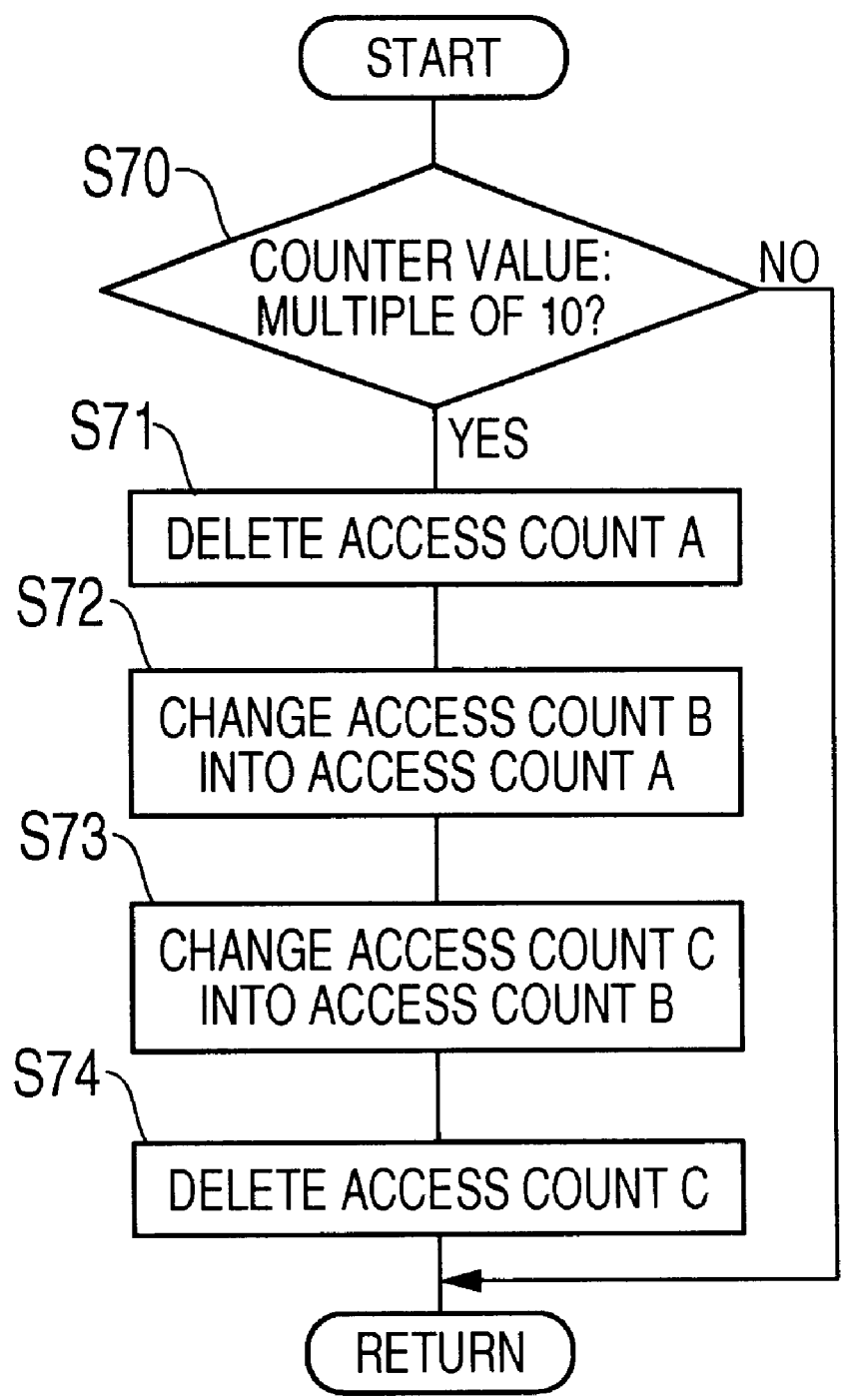
FIG. 8 is a flow chart showing a process for updating the access frequency table by a control section of the mobile station in the first embodiment.

FIG. 8 shows an outline of the process for updating the access frequency table carried out by the control 36 of the mobile station $20_1$ in the first embodiment. The control section 36 checks whether or not the number of days counted by the counter is a multiple of "10" (step S70). When the control section 36 detects that the number of the days is a multiple of "10" (step S70: Y), the control section 36 first deletes all of the access count data A 63 before 20 to 29 days regarding the all items registered in the access frequency table (step S71). Next, the access count data B 64 before 10 to 19 days are written or copied into the fields of the access count data A 63 before 20 to 29 days in the access frequency table 60 (step S72). Then, the access count data C 65 before 0 to 9 days are over-written or copied into the fields of the access count data B 64 before 10 to 19 days in the access frequency table 60 (step S73). Furthermore, the access count data C 65 before 0 to 9 days are all deleted in the access frequency table 60 (step S74). Thus, after the above process for updating the access frequency table 60, the access counts of all the item data are newly registered in the access frequency table as values of the access count data C 65.

The control section 36 of the mobile station $20_1$ to increase the access count in the access frequency table 60, each time an access request is issued to an already registered content server 24. When an access request is issued to a non-registered content server 24, the item data of the requested content server 24 is registered as a new item data. The content data stored in the content server 24 of the data communication system in the first embodiment is added with a flag on a page of the content data in the higher hierarchical layer. The mobile station $20_1$ as a data communication apparatus receives the content data and checks whether or not the flag is added to the received content data. Thus, the mobile station $20_1$ can easily determine that the received content data is the page of the content data in the higher hierarchical layer. In this way, the content data in the higher hierarchical layer is registered on the access frequency table 60 so that the storage capacity of the access frequency table 60 can be reduced.

Figure 9:
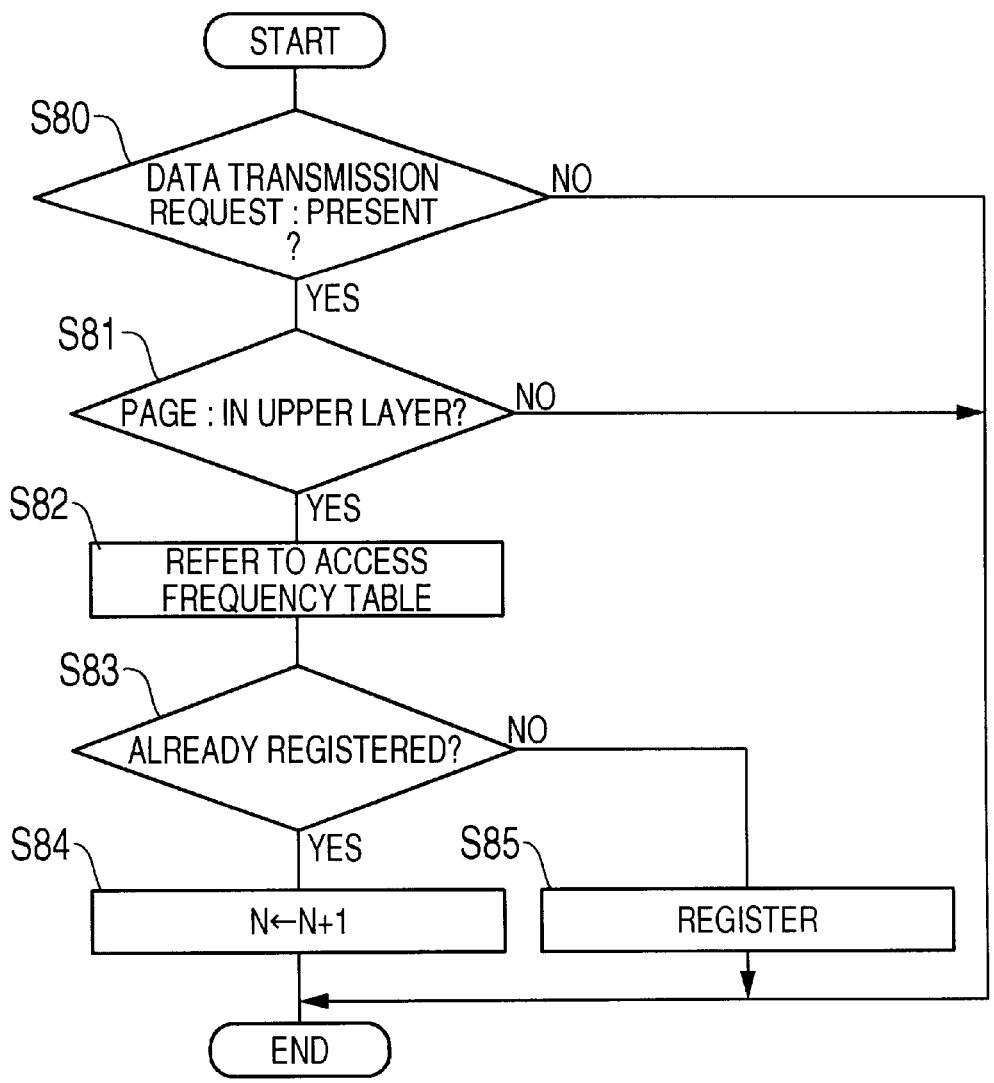
FIG. 9 is a flow chart showing a process for registration on the access frequency table in the control section.

FIG. 9 shows an outline of the process for registration on the access frequency table 60 in the control section 36. Specifically, when the data transmission request is issued in accordance with the initial menu display data displayed on the display section 37 to acquire a desired content data (step S80: Y) after a session is established between the mobile station $20_1$ and the content server 24, the control section 36 checks whether or not a flag is added to the received content data to indicate the page of the content data in the higher hierarchical layer (step S81). When it is determined that the received content data is added with the flag and the page in the higher hierarchical layer (step S81: Y), the control section 36 refers to the access frequency table 60 to determine whether or not the content server 24 storing the content data for which the data transmission request has been issued is a registered server (step S82). When it is determined that the content server 24 is already registered in the access frequency table 60 (step S83: Y), the control section 36 adds "1" to the access count N (step S84), and ends the series of processes.

When it is determined that the content server 24 storing the received content data is not yet registered on the access frequency table (step S83: N), the values of the access count data A and B are set to be "0", and the value of the access count data C is set to be "1". Then, the URL 61 of the content server 24 and the name of the item data 62 of the requested content data are newly registered (step S85), and the series of processes is ended.

When there is no data transmission request (step S80: N), or when the flag is not added to indicate that the received data is the page in the higher hierarchical layer (step S81: N), the access to the next page is waited for without changing the access count data 65, and the series of processes is ended.

As shown above, in the data communication apparatus and data communication system in the first embodiment, the initial menu display data is displayed on the display section 37 based on the initial menu display data stored in the memory 40 in the mobile station $20_1$, after the mobile station $20_1$ as a data communication apparatus establishes a session with the content server 24 storing content data. The initial menu display data is generated based on the access frequency table 60 which stores the access frequency of the content data in the higher hierarchical layer, i.e., the access counts of the content data over the three periods, in which one period is equivalent to the length of every 10 days. Then, when desired content data is selected in accordance with the initial menu display data displayed on the display section 37, a data transmission request is issued to the content server 24 linked to the selected content data for acquirement of the content data. With this arrangement, it is not necessary to receive the initial menu display data prior to the reception of the content data such as characters, figures, and images from the content server 24. The initial menu display data can be displayed in accordance with the access state of each user. Therefore, it is unnecessary for the user to follow the menu hierarchy in order to access the desired content data, whereby operational performance can be greatly improved. Also, the user can easily operate the data communication apparatus. In addition, it is not necessary to receive the initial menu display data every time the mobile station $20_1$ is connected to the server. Therefore, the reduction in traffic and communication cost can be both achieved.

Second Embodiment

In the data communication apparatus and data communication system in the first embodiment, the mobile station $20_1$ receiving content data as a data communication apparatus displays the initial menu display data in accordance with the access state of the user. Thus, the troublesome operation can be omitted so that the following of the menu hierarchy is not necessary in order for the user to access the desired content data. However, in the data communication apparatus and data communication system in the second embodiment, an initial menu display data for a certain field in which the user is interested can be provided. Thus, the troublesome operation of following the menu hierarchy will be omitted, while the content data desired by the user is provided.

The structure of the data communication system according to the second embodiment of the present invention is the same as that of the data communication system in the first embodiment shown in FIG. 3. Therefore, the description thereof is omitted. Also, the structure of the mobile station $20_1$ as the data communication apparatus is the same as the structure of the mobile station $20_1$ as the data communication apparatus in the first embodiment shown in FIG. 4. Therefore, the description thereof is omitted.

In the data communication system in the second embodiment, after the mobile station $20_1$ as the data communication apparatus establishes a session with the content server 24, an initial menu data download screen data is read out and displayed. The initial menu data download screen data is stored in advance. Then, an initial menu data selected by a user from the initial menu data download screen data displayed on the display section 37 is downloaded from the content server 24 and store in the memory 40 as initial menu display data. Thus, the initial menu display data is updated. The mobile station $20_1$ in the second embodiment can carry out the above initial menu data selection control by a CPU based on a control program stored in the memory 40.

Figure 10:
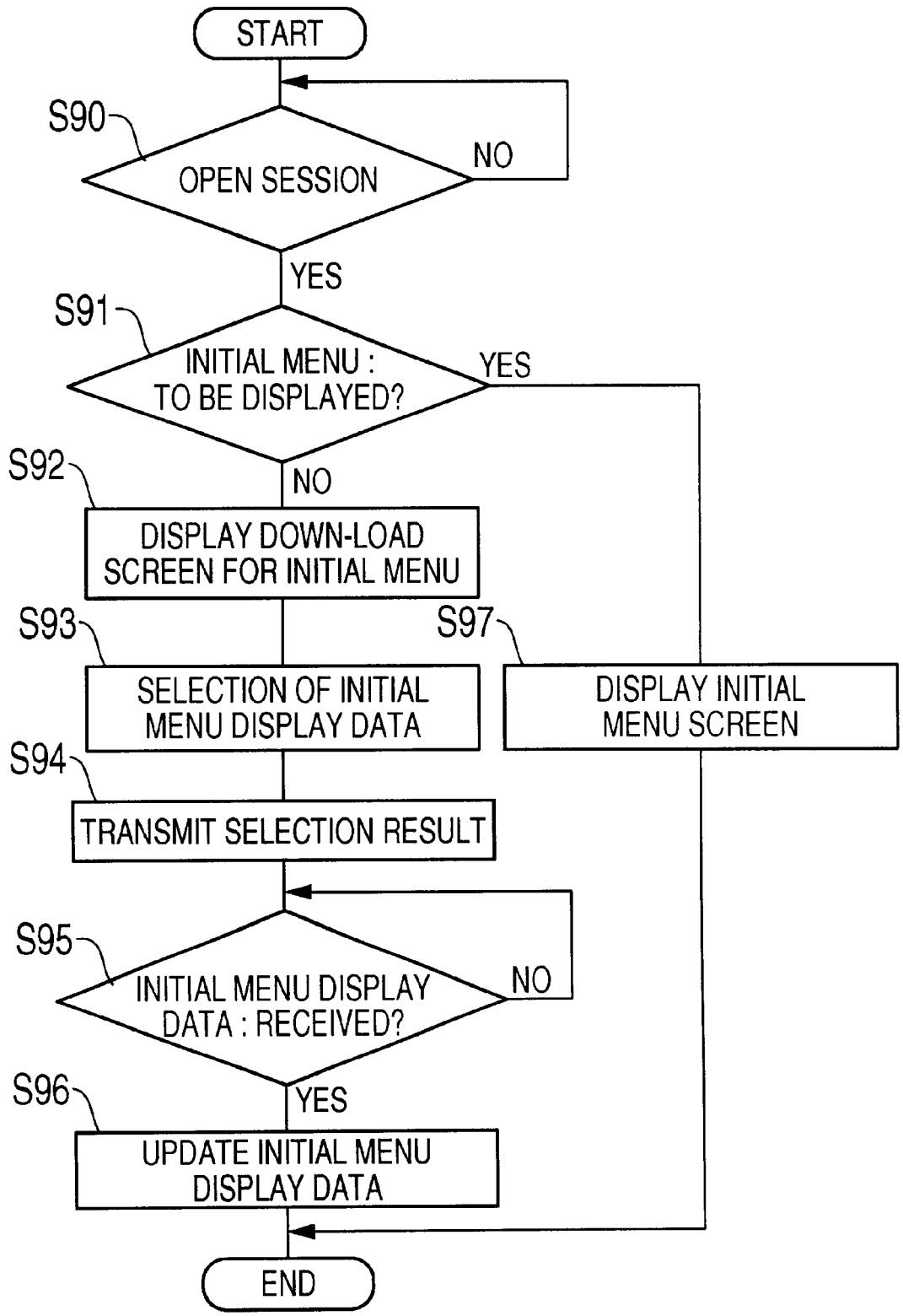
FIG. 10 is a flow chart showing a process of initial menu display data selection carried out by the mobile station in a second embodiment.

FIG. 10 shows an outline of the process of the initial menu data selection carried out by the mobile station $20_1$ as the data communication apparatus in the second embodiment. Specifically, the control section 36 of the mobile station $20_1$ monitors establishment of the session between the mobile station $20_1$ and the content server 24 (step S90: N). When the establishment of the session is detected (step S90: Y), the control section 36 reads out the initial menu display data already stored in the memory 40 to allow the user to determine whether or not the initial menu display data should be displayed (step S91). When the user determines that the initial menu display data does not have to be displayed, or when an initial menu display data prepared in accordance with the field of his interest is yet to be registered in the memory 40 (step S91: N), the control section 36 reads out the initial menu data download screen data stored in the memory 40 of the mobile station $20_1$ to display the read-out data on the display (step S92). The initial menu data download screen data is used for selecting the initial menu display data to be registered in the mobile station $20_1$ from among initial menu display data prepared for various types of users, such as by age, sex, hobby, and favorite music of the user. When the user of the mobile station $20_1$ selects the initial menu display data of the initial menu data download screen data (step S93), a data transmission request for the selected initial menu display data is transmitted to the content server 24 (step S94). Then, the mobile station $20_1$ waits for the initial menu display data sent from the content server 24 (step S95: N).

When the control section 36 detects the reception of the selected initial menu display data sent from the content server 24 (step S95: Y), the control section 36 controls the display section 37 to display the sent initial menu display data. Also, the control section 36 updates or stores the sent initial menu display data for a new initial menu display screen in the memory 40 (step S96). Thereafter, the series of process is ended.

Meanwhile, in a step S91, when the user determines to display an initial menu display data already stored in the memory 40 (step S91: Y), the control section 36 reads out the registered initial menu display data in step S96 to display the data on the display section 37 (step S97). Thereafter, the series of process is ended.

As mentioned above, the content server 24 stores a plurality of initial menu display data for each type such as the age, sex, hobby, and favorite music of user. The content server 24 transmits the initial menu display data selected by the user to the mobile station $20_1$ in response to the data transmission request.

The content server 24 has a CPU (not shown) to allow the above control. Thus, the CPU carries out the above-described control in accordance with a control program stored in a memory.

Figure 11:
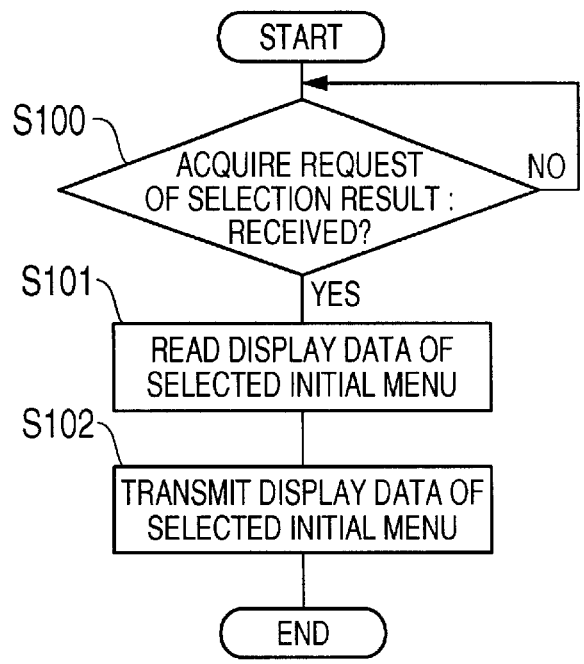
FIG. 11 is a flow chart showing a process for initial menu display data transmission from a content server in the second embodiment.

FIG. 11 shows an outline of an initial menu display data transmission process of the content server 24 in the second embodiment. The content server 24 monitors the reception of the data transmission request from the mobile station $20_1$ for the selected initial menu display data (step S100: N) after establishing a session with the mobile station $20_1$. When the content server 24 detects the reception of the data transmission request (step S100: Y), the content server 24 reads out the initial menu display data in accordance with the received data transmission request (step S101). Then, the content server 24 transmits the data to the mobile station $20_1$ (step S102).

Figure 12:
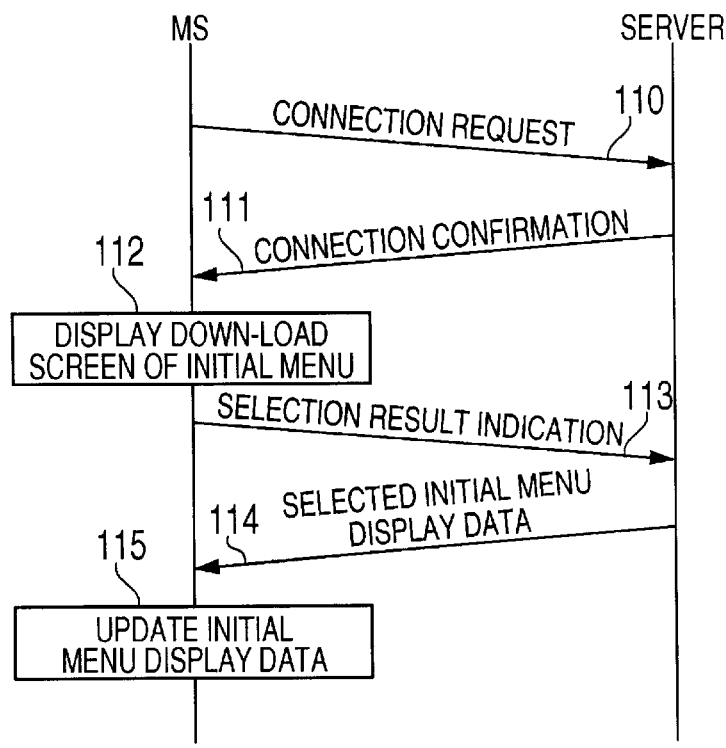
FIG. 12 is a sequence diagram showing an operation of the data communication system in the second embodiment.

FIG. 12 shows an example of the operation of the data communication system in accordance with the second embodiment. First, in order to acquire content data, a mobile station $20_1$ as the data communication apparatus sends a connection request 110 to a content server 24 via a base station 23, a switching apparatus 22, and a gateway. The content server 24 receives the connection request 110, and approves connection to send back a connection confirmation 111 to the mobile station $20_1$. Through this operation, the session between the content server 24 and the mobile station $20_1$ is established.

When the session is established and an instruction for displaying the initial menu display data download data is given by the user, the mobile station $20_1$ reads out the initial menu display data download data stored in the inside memory 40 to display on the display section 37 (DISPLAY DOWNLOAD SCREEN OF INITIAL MENU 112). When the user selects the initial menu display data of a desired type from the displayed initial menu display data download screen, a selection result indication 113 is transmitted to the content server 24 via the base station 23, the switching apparatus 22, and the gateway server 25. In response to this indication, the content server 24 transmits the initial menu display data 114 required by the mobile station $20_1$ to the mobile station $20_1$. After receiving the initial menu display data 114, the control section 36 of the mobile station $20_1$ displays the initial menu display data 114 on the display section 37. Also, the control section 36 registers the initial menu display data in the memory 40 (UPDATE SELECTED INITIAL MENU DISPLAY DATA 115). After this, the initial menu display data is displayed based on the initial menu display data registered in the memory 40, so that the user can easily access the desired content data.

In this way, in the data communication apparatus and the data communication system in accordance with the second embodiment of the present invention, the mobile station $20_1$ displays the initial menu display data download data for acquiring an initial menu display data adaptive for the interest of the user, after the session between the mobile station $20_1$ as the data communication apparatus and the content server 24 is established. The content server 24 stores in advance initial menu display data for each of various types in accordance with the interests of the user. The mobile station $20_1$ transmits to the content server 24, a data transmission request for the initial menu display data selected in accordance with the initial menu display data download data. Thus, the initial menu display data corresponding to the initial menu display data can be displayed.

The first embodiment is greatly useful in a range of the initial menu display data already accessed by the user. A troublesome operation of searching menu display data may be needed in the case of the type which the user has interest and which is not yet accessed. However, in the second embodiment, the initial menu display data adaptive for the interests of the user can be displayed. Thus, the above troublesome operation can be greatly reduced.

Third Embodiment

In the data communication apparatus and the data communication system in accordance with the second embodiment, the most suitable initial menu display data is selected by the user of the mobile station $20_1$ from among a plurality of initial menu data of the various types prepared in advance. However, in the data communication apparatus and the data communication system in accordance with the third embodiment, the initial menu display data most adaptive for the interest of the user can be displayed without the operation of menu data selection by the user of the mobile station $20_1$.

The structure of the data communication system in the third embodiment of the present invention is the same as that of the data communication system in the first embodiment shown in FIG. 3. Therefore, the description thereof will be omitted. In addition, the structure of the mobile station $20_1$ as the data communication apparatus in accordance with the third embodiment is the same as that of the mobile station $20_1$ as the data communication apparatus in accordance with the first embodiment shown in FIG. 4. Therefore, the description thereof will be omitted.

In the data communication system in accordance with the third embodiment, the mobile station $20_1$ as the data communication apparatus has the access frequency table storing access count within periods in the past, like the first embodiment shown in FIG. 6. Also, the mobile station $20_1$ transmits the access frequency table to a content server 24 in the process for updating initial menu data. The content server 24 analyzes the access tendency based on the received access frequency table to send the initial menu display data in accordance with the analyzed result. The process for updating the initial menu display data is carried out in response to an instruction inputted from the user or periodically generated.

The mobile station $20_1$ and the content server 24 in the third embodiment carry out the above-described initial menu display data selection control by CPUs based on control programs.

Figure 13:
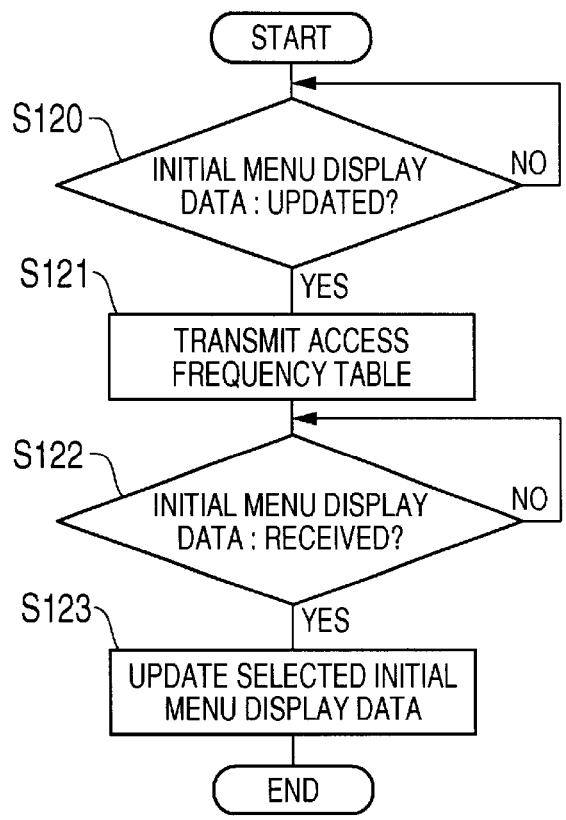
FIG. 13 is a flow chart showing a process for initial menu display data updating carried out by the mobile station in the third embodiment.

FIG. 13 shows an outline of the initial menu display data updating process carried out by the mobile station $20_1$ as the data communication apparatus in accordance with the third embodiment. In this case, it is supposed that the session has already been established between the mobile station $20_1$ and the content server 24. The control section 36 of the mobile station $20_1$ waits for an instruction inputted from a user or periodically generated (step S120: N). When the control section 36 of the mobile station $20_1$ detects the instruction (step S120: Y), the control section 36 transmits the access frequency table shown in FIG. 6 stored in the memory 40 to the content server 24 (step S121). The control section 36 monitors the reception of the initial menu display data transmitted from the content server 24 based on the analysis result of the transmitted access frequency table (step S122: N). When the control section 36 detects the reception of the initial menu display data (step S122: Y), the control section 36 displays an initial menu on the display section 37 based on the initial menu display data. Also, the control section 36 registers the received initial menu display data as new initial menu display data in the memory 40 (step S123). After this, the initial menu display data is displayed based on the initial menu display data registered in the memory 40 and a user can easily access the desired content data.

The content server 24 analyzes the access frequency table received from the mobile station $20_1$ as described above. Then, the content server 24 selects the most adaptive initial menu display data from among a plurality of initial menu display data stored in advance based on the analysis result, and transmits to the selected initial menu display data to the mobile station $20_1$.

Figure 14:
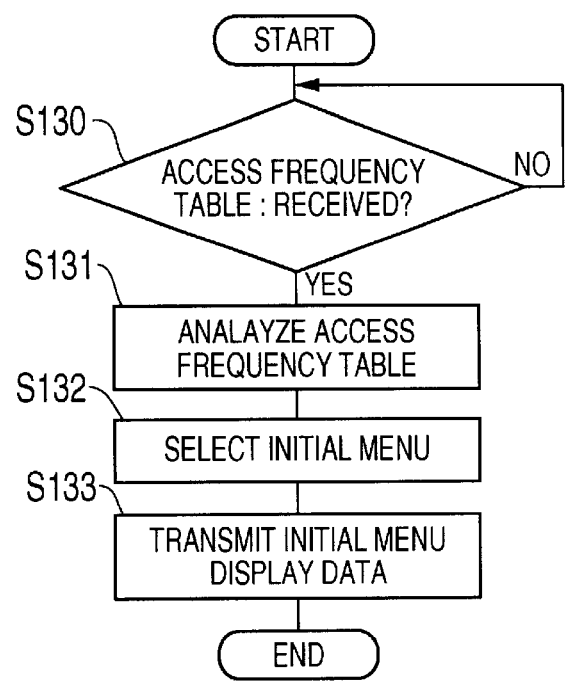
FIG. 14 is a flow chart showing a process for initial menu display data transmission from the content server in the third embodiment.

FIG. 14 shows an outline of the initial menu display data transmitting process of the content server 24 in the third embodiment. After the session is established between the content server 24 and the mobile station $20_1$, the content server 24 monitors the reception of the access frequency table sent from the mobile station (step S130: N). When the content server 24 detects the reception of the access frequency table (step S130: Y), the content server 24 analyzes the access tendency based on the received access frequency table (step S131). In the analysis of the access tendency, for example, the transmission source address data registered in the access frequency table are classified based on the URLs of ".co.jp" and ".gov". Instead, the transmission source address data are classified based on URLs. Thus, the access counts are summed in units of types such as business, economy, music and sports.

The content server 24 stores a plurality of initial menu display data in accordance with access tendencies of the respective types. The content server 24 selects the most adaptive initial menu display data from among the plurality of initial menu display data. For this purpose, the content server 24 determines the access tendency of the user based on a ratio of the access count in each type to a total of the access counts. Then, the content server 24 compares the determined access tendency with a plurality of access-tendency models prepared in advance to determine a consistence degree between the determined access tendency with each of the plurality of access tendency models. Thus, the content server 24 selects the initial menu display data based on the consistence degrees. In this way, when the initial menu display data is selected (step S132), the content server 24 transmits the selected initial menu display data to the mobile station $20_1$ (step S133). In this case, the initial menu display data may be selected in accordance with the combination of the access tendency with the highest ratio and the access tendency with the second highest ratio.

Figure 15:
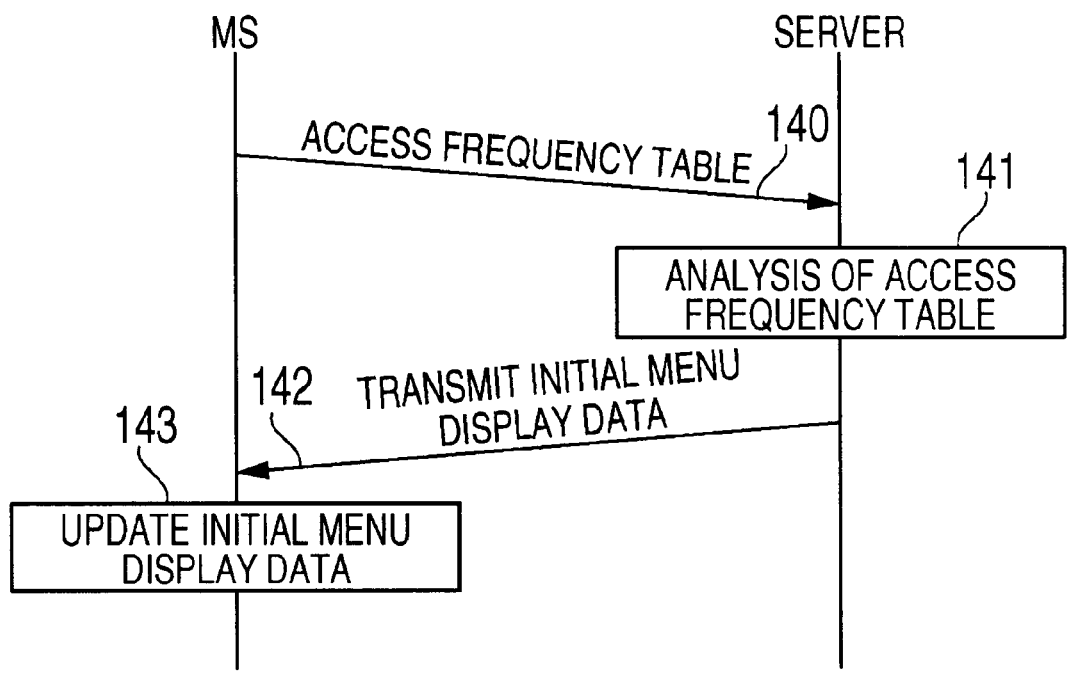
FIG. 15 is a sequence diagram showing an operation of the data communication system in the third embodiment.

FIG. 15 shows an example of the operation of the data communication system in accordance with the third embodiment. First, the session is established between the mobile station $20_1$ and the content server 24. When the predetermined instruction is issued, an initial menu display data updating process is started. At this time, the mobile station $20_1$ as the data communication apparatus transmits the access frequency table 140 to the content server 24 via the base station 23, the switching apparatus 22, and the gateway server 25. The content server 24 receives the access frequency table 140, and analyzes the access tendency of the user of the mobile station $20_1$ based on the received access frequency table 140, as described above (step S141). The content server 24 selects the initial menu display data 142 most adaptive or suitable for the analysis result from among the plurality of initial menu display data stored in advance for various access tendencies. Then, the content server 24 transmits the selected initial menu display data 142 to the mobile station $20_1$. When the mobile station $20_1$ receives the transmitted initial menu display data 142, the mobile station $20_1$ displays an initial menu on the display section 37 in accordance with the received initial menu display data 142. Also, the mobile station $20_1$ updates the initial menu display data stored in the memory 40 (step 143). After this, the user can controls the display section 37 to display the initial menu based on the initial menu display data stored in the memory 40 and easily access the desired content.

In this way, in the data communication apparatus and the data communication system in accordance with the third embodiment, the mobile station $20_1$ as the data communication apparatus stores the access frequency table storing the access counts in time periods in the past. In the initial menu display data updating process, the mobile station $20_1$ transmits the access frequency table to the content server 24. The content server 24 receives the access frequency table to analyze the access tendency of the user. Then, the content server 24 selects initial menu display data most adaptive for the result of the analysis from among the plurality of initial menu display data stored in advance for various access tendencies. Then, the content server 24 transmits the selected initial menu display data to the mobile station $20_1$. The mobile station $20_1$ displays the initial menu display data most adaptive for the interest of the user based on the transmitted initial menu display data. As a result, in the third embodiment, it is unnecessary for the user to carry out the operation for menu selection of the initial menu display data in accordance with the interest of the user, unlike the second embodiment. Thus, the third embodiment can provide the data communication apparatus and the data communication system permitting an easy operation.

In the data communication system of each of the second and third embodiments, the content server 24 transmits the initial menu display data. However, the present invention is not restricted to these embodiments. The gateway server 25 may store the plurality of initial menu display data and transmits the selected initial menu display data to the mobile station $20_1$. In this case, the content server 24 transmits only content data requested from the mobile station $20_1$.

Figure 16:
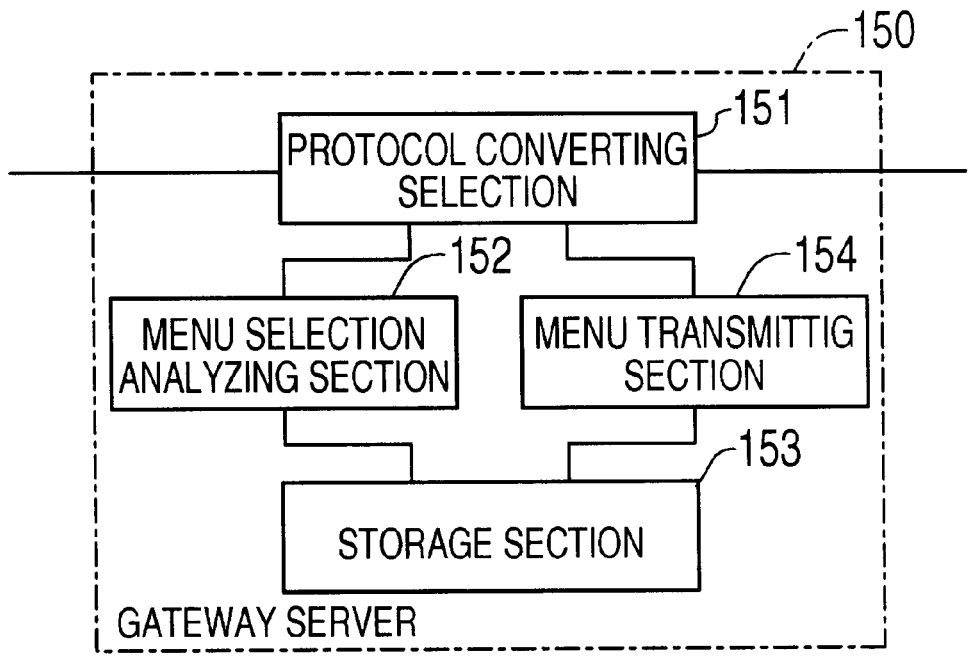
FIG. 16 is a block diagram showing the structure of a gateway server in a modified example of the present invention.

FIG. 16 shows an outline of the structure of the gateway server 25 in accordance with the modified example. A gateway server 25 50 in the modified example has a protocol conversion section 151, an analyzing and menu selecting section 152, a memory 153 and a menu transmission section 15. The memory 153 stores a plurality of initial menu display data in advance. The analyzing and menu selecting section 152 analyzes the access frequency table and selects one of from among the plurality of initial menu display data stored in the memory 153 based on the analyzing result. The menu transmission section 154 transmits the selected initial menu display data to the mobile station $20_1$.

The protocol conversion section 151 carries out conversion between the communication protocol to the content server 24 and the communication protocol used between the mobile station $20_1$ and the switching apparatus 22 via the base station 23. For example, the content data described in HTML transmitted to the content server 24 is converted into the content data described in C-HTML or WML which is transmitted to the mobile station $20_1$.

The analyzing and menu selecting section 152 selects the initial menu display data in accordance with an initial menu display data selection instruction sent from the mobile station $20_1$. For example, when the analyzing and menu selecting section 152 receives the initial menu display data selection instruction sent from the mobile station $20_1$ in the second embodiment, the analyzing and menu selecting section 152 selects the initial menu display data from among the plurality of initial menu display data stored in the memory 153 in accordance with the received instruction. In addition, when the analyzing and menu selecting section 152 receives the access frequency table sent from the mobile station $20_1$ in the third embodiment, the analyzing and menu selecting section 152 analyzes the access tendency of the user of the mobile station $20_1$. Then, the analyzing and menu selecting section 152 selects the adaptive initial menu display data corresponding to the access tendency of the user from among the plurality of initial menu display data stored in the memory 153 in accordance with the analysis result.

In this way, in the data communication system in accordance with the modified example, the gateway server 25 stores the plurality of initial menu display data, and carries out the analysis and selection of the initial menu display data. Therefore, the traffic on the Internet accommodating the content server 24 can be decreased and loads imposed on the content server 24 can be reduced.

It should be noted that in the data communication apparatus and the data communication system in accordance with the second embodiment, the initial menu display data to be updated is selected in accordance with the initial menu display data download screen. However, this is not only the case applicable to the present invention. For example, the mobile station may display a screen of a plurality of items such as age, sex, hobby, the genre of favorite music, and the level of the interest in sports in a conversation form and may transmit the conversation result. The server may analyze the received conversation result and select and transmit the initial menu display data most suitable for the analyzed result from the plurality of initial menu display data.

Also, in the data communication system of each of the second and third embodiments, and in the present modified example, the content server 24 or the gateway server 25 stores and transmits the initial menu display data. However, the present invention is not restricted to this. For example, the gateway server 25 and the content server 24 share the transmission, selection and analysis for the initial menu display data.

Further, when the mobile station as the data communication apparatus in each of the first to third embodiments and the modified example is a mobile phone, it is also possible to use a subscriber identification module (SIM) for storing the initial menu display data. The subscriber identification module is a memory element in which identification data and a dial number of a subscriber are stored and is detachable from the mobile phone.

Furthermore, the present invention can be applied not only to the mobile phone but also to various kinds of data communication apparatuses such as PDA.

As described above, in accordance with the present invention, it is not necessary to receive the data menu display data displayed from the server prior to the reception of content data composed of characters, figures, and images. The initial menu display data can be displayed in accordance with the access tendency of the user stored in the data communication apparatus. As a result, since the user does not have to follow the hierarchy of menu in order to access the desired content data. Thus, operation performance can be greatly improved, and the user can easily operate the data communication apparatus. Moreover, since the initial menu display data is no longer transmitted every time the data communication apparatus is connected to the content server 24, both traffic decrease and reduction in the communication cost can be simultaneously achieved.

Also, the access count is updated for every access, and the menu display data is also updated based on the access counts. Therefore, the user can always access the content data in accordance with a menu display data most suitable for the interest of the user. Thus, operational performance can be greatly improved.

Also, it is possible to avoid a situation in which all of the access frequencies from an access starting time are accumulated so that a memory overflows. In addition, even when the access count changes only during a period of time, the past access tendency can be grasped during a long period of time. Thus, the initial menu display data does not have to be changed with temporary change in the access tendency.

Also, the access count is counted only when the data in a predetermined layer of hierarchical data is received. Thus, the capacity of the memory for storing the access count can be reduced. In addition, the presence or absence of a flag indicates whether or not the received data is in the predetermined layer. Therefore, the process for counting the access count can be simplified.

Further, a troublesome operation of following the menu has been conventionally needed in case of the content data of a type not yet accessed. However, the initial menu display data is already generated in accordance with the type in which the user is interested. Therefore, the above troublesome operation can be greatly reduced.

Furthermore, the most suitable menu display data can be provided based on a conversation result about items in the data communication apparatus of the present invention. Therefore, even if the type of data for every operation is different, a menu display data most suitable for each type of the data can be provided. Thus, the troublesome operation of following the hierarchy of menu can be eliminated.

Also, the user does not have to carry out a selecting operation for the display of the initial menu display data of a new type. Therefore, the present invention can provide the data communication apparatus and the data communication system permitting easy operation.

In addition, the content data can be acquired based on the received menu display data, and the menu display data is stored in the storage section. After this, a menu display data is displayed based on the menu display data stored in the storage section, and the desired content data can be acquired. As a result, it is unnecessary to receive transmitted menu display data again. Also, the menu display data is described in a predetermined data description language. Therefore, the present invention can be easily applied to the Internet as the existing network system.

Furthermore, the above-described menu display data may be stored in the subscriber identification module (SIM) that stores identification data and a dial number of a subscriber. The subscriber identification module is detachable from the mobile station. Therefore, the invention can provide the data communication apparatus and the data communication system, in which operation performance most suitable for each user can be attained regardless of countries and the difference of systems.

What is claimed is:

1. A data communication system comprising:

a plurality of server sections, each server section configured to store content data; and a mobile station configured to connect to said plurality of server sections, having a table which stores a set of address data and identification data for each of said plurality of server sections, and further configured to display said identification data of said table for said plurality of server sections, and to automatically transmit a data transmission request to a specific one of said plurality of server sections based on said address data corresponding to said specific server section, when said identification data for said specific server section is selected;

said specific server section further configured to transmit said content data stored therein to said mobile station;

said mobile station further configured to display said content data transmitted from said specific server section;

said table further including count data for at least one time period in addition to said address data and said identification data as said set for each of said plurality of server sections;

said content data comprising data elements; and said mobile station configured to count up said count data, when said mobile station receives a head one of said data elements of said content data from said specific server section.

2. The data communication system according to claim 1, said mobile station being configured to register said identification data and said address data of said another server section on said table and to count up said count data for said another server section when said mobile station receives a head one of data elements of content data from another server section.

3. The data communication system according to claim 1, wherein said table includes said count data for each of a plurality of time periods, said mobile station is configured to sequentially shift said count data for one time period as said count data for the time period before said one time period, when the latest time period has elapsed.

4. A data communication system comprising:

a first server section configured to store content data;

a second server section configured to store a plurality of initial menu display data; and a mobile station configured to connect to said first and second server section and to have a table which stores a set of address data, identification data and count data for at least one time period for at least one server section, wherein said mobile station is configured to read out said table to transmit to said second server section, said second server is configured to determine one of said plurality of initial menu display data based on content of said table to transmit to said mobile station, said initial menu display data including a set of address data and identification data of said first server section, said mobile station is configured to display said initial menu display data, and to automatically transmit a data transmission request to said first server section based on said address data of said first server section, when said identification data for said first server section is selected, said first server section configured to transmit said content data stored therein to said mobile station, and said mobile station configured to display said content data transmitted from said first server section.

5. The data communication system according to claim 4, wherein said first server section and said second server section are identical.

6. The data communication system according to claim 4, wherein said mobile station stores said initial menu display data transmitted from said second server section in said table, said content data is composed of data elements, and said mobile station is further configured to count up said count data when said mobile station receives a head one of said data elements of said content data from said first server section.

7. The data communication system according to claim 6, wherein when said mobile station receives a head one of data elements of content data from another server section, said mobile station registers said identification data and said address data of said another server section on said table and counts up said count data for said another server station.

8. The data communication system according to claim 6, wherein said mobile station sequentially shifts said count data for one time period as said count data for the time period before said one time period, when the latest time period has elapsed.

9. A data communication terminal comprising:

a display section;

a communication section;

a memory configured to store a table storing a set of address data, identification data and count data for at least one time period for each of a plurality of server sections; and a control section configured: to control said display section to display said identification data of said table for said plurality of server sections, to control said communication section to automatically transmit a data transmission request to a first one of said plurality of server sections based on said address data corresponding to said first server section, when said identification data for said first server section is selected on said display section, and to control said display section to display said content data transmitted from said first server section.

10. The data communication terminal according to claim 9, wherein said content data is composed of data elements, and said control section is configured to count up said count data, when a head one of said data elements of said content data is received from said first server section by said communication section.

11. The data communication terminal according to claim 10, said control section being configured to register said identification data and said address data of said another server section on said table and to count up said count data for said another server station, when the head one of data elements of content data is received from another server section by said communication section.

12. The data communication terminal according to claim 9, wherein said table includes said count data for each of a plurality of time periods, said control section is configured to sequentially shift said count data for one time period as said count data for the time period before said one time period, when the latest time period has elapsed.

13. The data communication terminal according to claim 9, said memory being configured to store download screen data; and said control section being further configured to read out said download screen data from said memory, to control said display section to display a download screen composed of items based on said read out download screen data, to control said communication section to transmit item selection data indicative of one of said items to a second one of said plurality of server sections when said one item of said items is selected on said display section, to control said communication section to receive initial menu display data corresponding to said item selection data, and to control said display section to display the received initial menu display data.

14. The data communication terminal according to claim 13, wherein said first server section and said second server section are identical.

15. The data communication terminal according to claim 13, wherein said control section is configured to store said received initial menu display data in said table.

16. The data communication terminal according to claim 9, said control section being further configured: to read out said table, to control said communication section to transmit the read out table to a second one of said plurality of server sections, and to control said display section to display initial menu display data transmitted from said second server section based on said table.

17. The data communication terminal according to claim 16, wherein said first server section and said second server section are identical.

18. The data communication terminal according to claim 16, said control section being configured to store said initial menu display data transmitted from said second server section in said table.

19. A data communication system comprising:

a first server section configured to store content data;

a second server section configured to store a plurality of initial menu display data; and a mobile station configured to connect to said first and second server section and having a memory storing download screen data, wherein said mobile station is configured to read out said download screen data from said memory, to display a download screen composed of items, and to transmit, when said one item of said items is selected, item selection frequency data indicative of one of said items to said second server section, said second server section is configured to transmit one of said plurality of initial menu display data corresponding to said item selection frequency data to said mobile station, said initial menu display data including a set of address data and identification data of said first server section, said mobile station is further configured to display said initial menu display data, and to automatically transmit a data transmission request to said first server section based on said address data of said first server section, when said identification data for said first server section is selected, said first server section is further configured to transmit said content data stored therein to said mobile station, said mobile station is further configured to display said content data transmitted from said first server section and is further configured to store said initial menu display data transmitted from said second server section in a table of said memory, said table further includes count data for at least one time period in addition to said address data and said identification data as said set for said first server section, said content data is composed of data elements, and said mobile station is further configured to count up said count data when said mobile station receives a head one of said data elements of said content data from said first server section.

20. The data communication system according to claim 19, said mobile station being further configured to register said identification data and said address data of said another server section on said table and to count up said count data for said another server station, when said mobile station receives a head one of data elements of content data from another server section.

21. The data communication system according to claim 19, wherein said table includes said count data for each of a plurality of time periods, and said mobile station is further configured to sequentially shift said count data for one time period as said count data for the time period before said one time period, when the latest time period has elapsed.

* * * * *